(12) United States Patent
Hollenberg et al.

(10) Patent No.: US 10,225,407 B2
(45) Date of Patent: *Mar. 5, 2019

(54) PINNING IN AN INTERACTIVE MEDIA/VOICE RESPONSE SYSTEM

(71) Applicant: GENESYS TELECOMMUNICATIONS LABORATORIES, INC., Daly City, CA (US)

(72) Inventors: Todd Hollenberg, Lafayette, CA (US); Aaron Wellman, Annandale, VA (US); Praphul Kumar, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,174

(22) Filed: Feb. 15, 2018

(65) Prior Publication Data

US 2018/0176378 A1 Jun. 21, 2018

Related U.S. Application Data

(63) Continuation of application No. 15/280,769, filed on Sep. 29, 2016, now Pat. No. 9,900,438.

(51) Int. Cl.
*H04M 11/00* (2006.01)
*H04M 3/527* (2006.01)
*G10L 15/22* (2006.01)
*G10L 15/26* (2006.01)
*H04M 3/42* (2006.01)
*H04M 3/493* (2006.01)

(52) U.S. Cl.
CPC ............. *H04M 3/527* (2013.01); *G10L 15/22* (2013.01); *G10L 15/26* (2013.01); *H04M 3/42059* (2013.01); *H04M 3/493* (2013.01); *G10L 2015/223* (2013.01); *H04M 2203/256* (2013.01)

(58) Field of Classification Search
CPC .... H04M 3/527; H04M 3/493; H04M 3/5166; G10L 15/22; G10L 2015/223
USPC ........................................ 379/88.18
See application file for complete search history.

(56) References Cited

U.S. PATENT DOCUMENTS

| | | | |
|---|---|---|---|
| 7,065,188 B1 * | 6/2006 | Mei ........................ | G10L 15/22 379/76 |
| 7,136,462 B2 * | 11/2006 | Pelaez ................. | H04M 3/5307 379/88.13 |
| 7,386,103 B1 * | 6/2008 | Chahal .................. | H04M 3/493 379/76 |
| 7,515,695 B1 * | 4/2009 | Chan ..................... | H04M 3/493 379/221.09 |
| 8,661,112 B2 * | 2/2014 | Creamer ........... | H04M 3/42059 379/88.16 |
| 8,681,970 B2 | 3/2014 | Fedorov et al. | |
| 2008/0304639 A1 * | 12/2008 | McDonough ......... | H04M 3/493 379/93.01 |
| 2014/0334614 A1 | 11/2014 | Mezhibovsky et al. | |

* cited by examiner

*Primary Examiner* — Van D Huynh

(57) ABSTRACT

A system and method for providing an interactive media response menu in an interactive media response (IMR) system is described. The system provides an end user with an IMR menu. The end user has the option to pin particular menu options throughout the IMR menu. During subsequent interactions with the IMR system, the end user can access a menu of his or her pinned menu options. The end user can select one of the pinned menu options and the IMR system will present that menu option to the end user.

18 Claims, 9 Drawing Sheets

PINNING IN AN INTERACTIVE MEDIA/VOICE RESPONSE SYSTEM

CROSS-REFERENCE TO RELATED APPLICATIONS:

This application is a continuation of U.S. patent application Ser. No. 15/280,769, filed on Sep. 29, 2016, now U.S. Pat. No. 9,900,438, the content of which is incorporated herein by reference.

BACKGROUND

Businesses often find it desirable to provide service to customers at least in part using an interactive voice or media response technology. For example, contact centers use interactive voice or media response systems to answer questions, provide information, gather data from the customer prior to routing the call to an agent, and/or providing other types of self-service functionality. In structuring the interactive voice or media response system, a business may attempt to organize the menus used by the system in such a way that customers can quickly and easily access the information or services they are seeking. However, as businesses offer a wider variety of services through these systems, navigation of even the best structured menu may become cumbersome, especially where a customer needs to navigate the menu multiple times. It may be desirable, therefore, to provide a system and method that allows customers to quickly and easily navigate to menu option items that they are interested in.

SUMMARY

In one aspect according to embodiments of the present invention, a method for generating a pin in an interactive voice response (IVR) system is provided. The method includes the steps of providing, by a processor, an IVR menu having a plurality of menu options; monitoring, by the processor, navigation of the IVR menu; storing, by the processor, an input received from an end user during the navigation of the IVR menu; receiving, by the processor, a command for creating a pin to a current menu option; receiving, by the processor, a user generated identifier for the pin; and storing, by the processor, the user generated identifier in association with the end user and the current menu option.

In another aspect according to embodiments of the present invention, a method for providing an interactive voice response (IVR) menu is provided. The method includes the steps of providing, by a processor, an IVR menu having a plurality of menu options; retrieving, by a processor, a pin stored in association with a user record, a first menu option of the plurality of menu options, and a user generated identifier; providing, by the processor, the user generated identifier to an end user; receiving, by the processor, a command provided by the end user selecting the user generated identifier; and providing, by the processor, in response to receiving the command, the first menu option.

In another aspect according to embodiments of the present invention, a system for providing an interactive voice response (IVR) menu is provided. The system includes a processor and memory. The memory is coupled to the processor and stores computer instructions therein. The instructions cause the processor to provide an IVR menu having a plurality of menu options; monitor navigation of the IVR menu; store an input received from an end user during the navigation of the IVR menu; receive a command for creating a pin to a current menu option; receive a user generated identifier for the pin; and store the user generated identifier in association with the end user and the current menu option.

In another aspect according to embodiments of the present invention, a system for providing an interactive voice response (IVR) menu is provided. The system includes a processor and memory. The memory is coupled to the processor and stores computer instructions therein. The instructions cause the processor to provide an IVR menu having a plurality of menu options; retrieve a pin stored in association with a user record, a first menu option of the plurality of menu options, and a user generated identifier; provide the user generated identifier to an end user; receive a command provided by the end user selecting the user generated identifier; and in response to receiving the command, provide the first menu option.

As a person of skill in the art should appreciate, the embodiments of the present invention allow interactions between customers and an IMR server to be conducted in a more expedited manner, bringing technical benefits to the contact center system. The faster an interaction between the customer and the IMR server, the quicker the freeing up of computing resources such as, for example, IMR ports. Further, providing the customer with access to desired information in a more expedited manner may provide a better customer experience and lead to positive business outcomes.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to a system and method that allows an end user to pin a menu option while navigating a menu or set of sub-menus, for example, a menu provided by an interactive media response system. During a first visit, the end user may navigate to a particular menu option and may pin that menu option. In subsequent visits, the user may return to the pinned menu option without expressly navigating through the menu items and responding to prompts leading to the option. In this regard, the context of the initial navigation leading to the pinned menu item is stored to allow the user to jump to the pinned menu item. Although the invoking of the pinned menu item a second time the caller wants to navigate to the same item is described as jumping, it may more accurately be thought as fast-forwarding, as context of the initial navigation may be recreated the second time as well, albeit not via express navigating of the menu options prior to reaching the pinned menu item.

Figure 1:
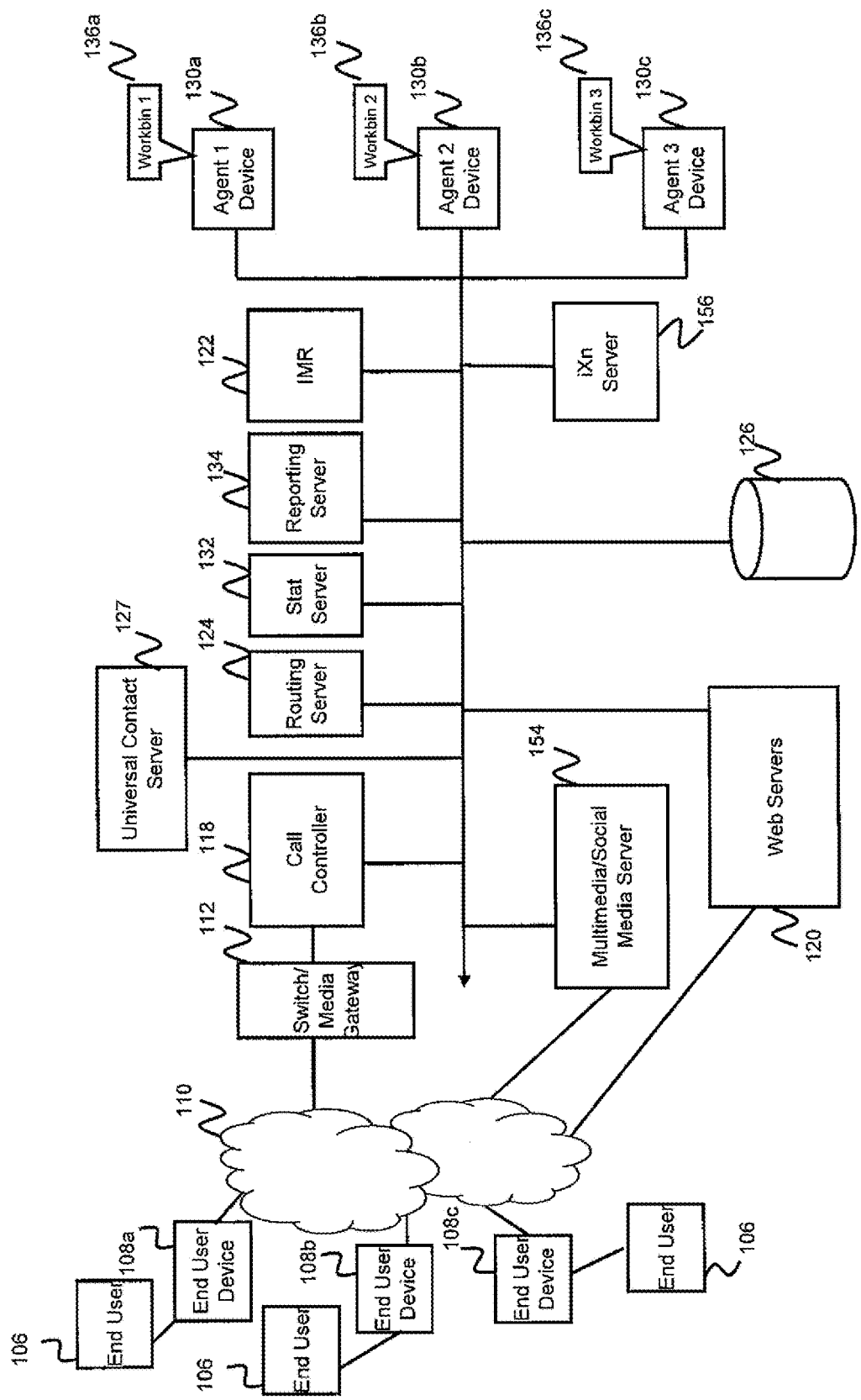
FIG. 1 is a conceptual diagram of a system for supporting a contact center in providing contact center services according to an exemplary embodiment of the disclosure.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels such as chat (e.g., via chat bots) web (e.g., visual IVR), and the like. Taking voice as an example, however, the IMR server 122 (or more specifically, the IVR server), may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. In this regard, the IMR includes (or is coupled to) automatic speech recognition (ASR) and speech synthesis (text-to-speech) engines for engaging in a voice dialog with the customer. The customer's response, once recognized by the ASR engine, may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 2:
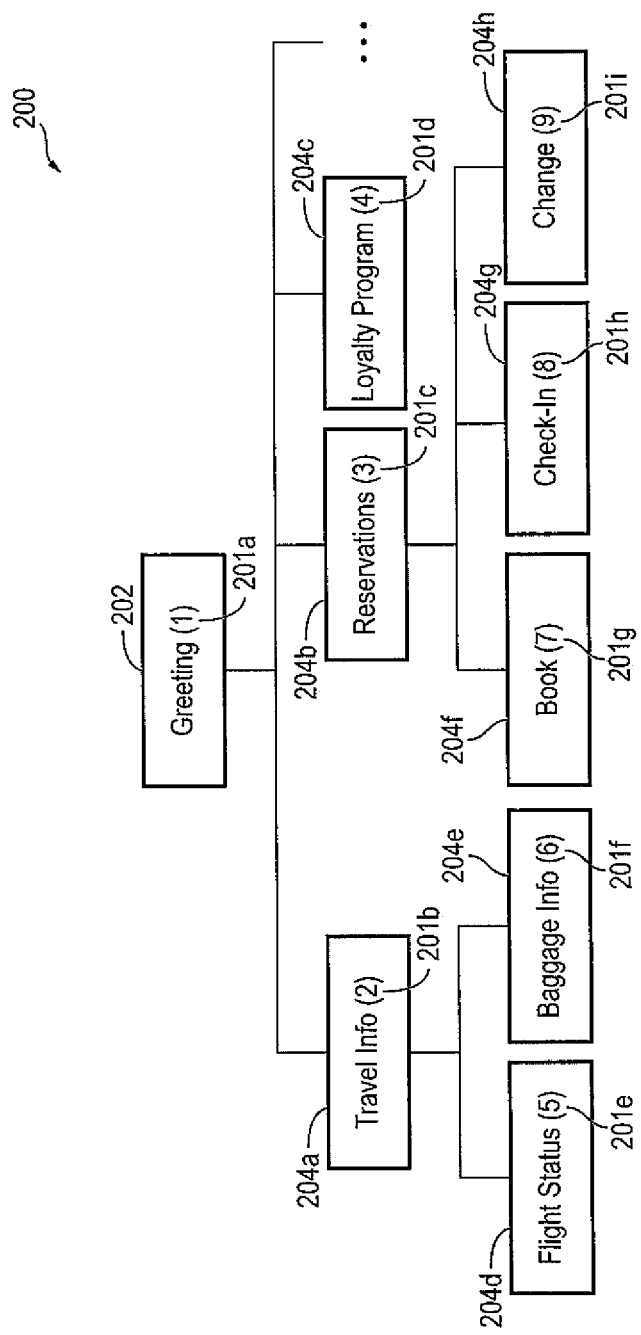
FIG. 2 is a block diagram representing an IMR menu according to an exemplary embodiment of the disclosure.

FIG. 2 is a conceptual layout diagram of an IMR menu according to an exemplary embodiment of the disclosure.

The IMR menu 200 includes a plurality of menu options 202 and 204a-h (collectively referred to as a menu option 204). A menu option may be associated with a message and one or more links or pointers to other menu options which a user can navigate to from the menu option. Each menu option may be associated with a unique identifier 201a-201i.

The exemplary IMR menu 200 of FIG. 2 represents an IMR menu for an airline. The exemplary menu includes a greeting and a first level of menu options which can be navigated to from the greeting. In this example, the first level of menu options includes a "Travel Info" menu option 204a, a "Reservations" menu option 204b, and a "Loyalty" menu option 204c. The "Travel Info" menu option 204a includes a pointer to a "Flight Status" menu option 204d and a pointer to a "Baggage Info" menu option 204e. The "Reservations" menu option 204b includes a pointer to a "Book" menu option 204f, a pointer to a "Check-In" menu option 204g, and a pointer to a "Change" menu option 204h.

In one exemplary operation of a conventional IMR system, an end user 106 desiring to check a flight status using the exemplary menu 200 of FIG. 2 initiates an interaction with a contact center and is routed to the IMR server 122. The end user is initially presented with the greeting 202 and the option to navigate to the "Travel Info" menu option 204a, the "Reservations" menu option 204b, or the "Loyalty Program" menu option 204c. Upon selection of the "Travel Info" menu option 204a, the end user is presented with the option to navigate to the "Flight Status" menu option 204d or the "Baggage Info" menu option 204e. The end user 106 selects the "Flight Status" menu option 204d. In response to selection of the "Flight Status" menu option 204d, the IMR server 122 prompts the end user 106 to enter a flight number. The IMR server 122 provides the user with the status of the flight upon receipt of the flight number and upon retrieval of status information from its database.

In another exemplary operation of a conventional IMR system, an end user 106 desiring to book a travel using the exemplary menu 200 of FIG. 2 initiates an interaction with a contact center and is routed to the IMR server 122. The end user is initially presented with the greeting 202 and the option to navigate to the "Travel Info" menu option 204a, the "Reservations" menu option 204b, or the "Loyalty Program" menu option 204c. Upon selection of the "Reservations" menu option 204b, the end user is presented with the option to navigate to the "Book" menu option 204f, the "Check-In" menu option 204g, or the "Change" menu option 204h. The end user 106 selects the "Book" menu option 204f. In response to selection of the "Book" menu option, the IMR server 122 prompts the end user 106 to enter travel information such as a home airport, a destination airport, travel dates, and/or the like. The IMR server 122 may also prompt the user to provide personal information, such as the user's name, contact information, payment information, frequent flyer number, and/or the like. Once the end user 106 has entered all of the requisite information, the IMR server 122 provides the user with available flights, or the call controller 118 may route the interaction to another contact center resource, such as a contact center agent, to continue booking.

Although the IMR menu 200 shown in FIG. 2 is hierarchical in structure, IMR menus according to the present disclosure are not limited to hierarchical structures. In some embodiments of the present disclosure, IMR menus have a graph structure, for example, a directed graph structure. For example, in the IMR menu 200 shown in FIG. 2, an end user 106 at the "Check-in" menu option 204g, upon completing the check-in process, could be presented the option to navigate to the "Flight Status" menu option 204d, allowing the end user 106 to monitor the status of their flight once checked in. In a further example, an end user 106 at the "Book" menu option 204f, upon completing the booking process, could be presented the option to navigate to the "Loyalty Program" menu option 204c.

A drawback in conventional IMR systems is that an end user 106 wishing to repeatedly access a particular self-service menu option (e.g. check a flight status or book a flight), generally has to go through the above processes of specifically navigating the IMR menu and entering information each time. Even if the user memorizes the path to the particular self-service option and need not listen to full instructions from the IMR before making the selections, the user is still expected to navigate the path expressly, and is still expected to enter information (e.g. flight number) in order to get the benefit of the self-service. This could become cumbersome and time consuming, especially in IMR systems with large or complex IMR menus.

Figure 3:
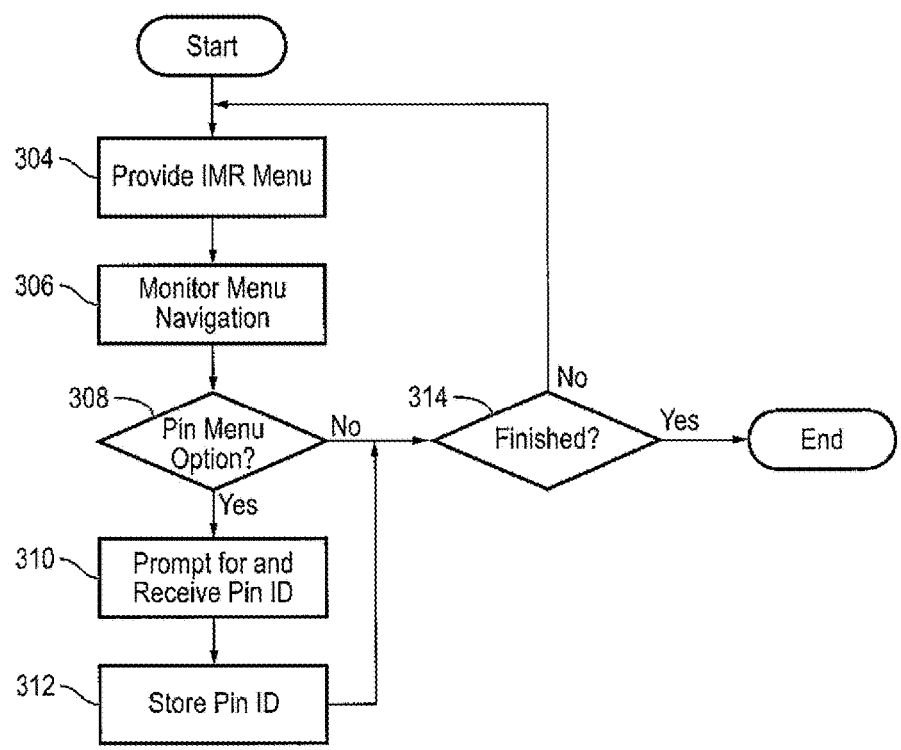
FIG. 3 is a flow diagram of a process for providing an IMR menu to an end user and allowing the end user to pin a location in the IMR menu according to an exemplary embodiment of the disclosure.

FIG. 3 is a flow diagram of a process for providing an IMR menu to an end user and allowing the end user to pin a location in the IMR menu according to an exemplary embodiment of the disclosure. For purposes of illustration, the process is described using the IMR menu 200 of FIG. 2 as an example. The IMR menu may be provided by different communication mediums/channels including, but not restricted to voice, chat, web, SMS, and the like. For example, the IMR server 122 may take the form of an IVR server, chat robot/server, video enabled avatar, web forms, graphical presentation of a menu structure, multi-channel IMR bundling voice and text, and the like. For purposes of illustration, it is assumed that the IMR server 122 is an IVR server interacting with the customer over a voice channel.

In the embodiment of FIG. 3, it is assumed that a telephony call to the contact center was placed by the end user 106 via the end user device 108. In response to receipt of the call, the call controller 118 routes the call to the IMR server 122, and a connection is established between the IMR server and the end user device 108.

In act 304, the IMR server 122 outputs an initial greeting and a first level of IMR menu options as identified by a script followed by the IMR server. The script may be, for example, a Voice Extensible Markup Language (VoiceXML) script. In delivering the first level of IMR menu options, the IMR server 122 may output a corresponding audio message which may inform the end user 106 of the current menu options that may be selected for navigation. Taking the exemplary IMR menu 200 of FIG. 2, the IMR server may output, after an initial greeting 202, a first level of menu options corresponding to "Travel Info" 204a, "Reservations" 204b, and "Loyalty Program" 204c. The IMR server may then prompt the end user to select a particular one of the currently output menu options.

In act 306, the IMR server 122 monitors navigation of the IMR menu 200 by the end user 106. In this regard, the IMR server 122 monitors selection of the various menu options as well as inputs from the end user in response to data requested by the IMR server 122 at various points of the navigation. In some embodiments, the IMR server 122 retains the path taken by the end user 106 in navigating the IMR menu. For example, the IMR server 122 may detect selection of menu options 204a and 204d in the exemplary menu 200 of FIG. 2, and retain the path of the navigation as (1), (2), and (5).

According to some embodiments, a menu option in the IMR menu 200 may prompt the end user to enter information. When the IMR server 122 receives the information from the end user, the IMR server 122 may store the information as context information in association with the specific menu option. In the exemplary menu 200 of FIG. 2, the IMR server 122 may store a specific flight number provided by the user upon selection of menu option 204d. In some embodiments, the IMR server 122 may additionally retrieve data from a storage device (such as mass storage device 126) based on the received information, and store the retrieved data as context information. For example, the IMR server 122 may receive an end user name or account number provided by the end user 106 upon selection of the "Check-In" menu option 204g, and in response, the IMR server 122 may retrieve flight reservations associated with the user or account and store the flight numbers for those reservations as context information. The content of the message associated with a menu option, or the menu options to which an end user can navigate from a menu option, may be based on context information. For example, the IMR server 122 may query an end user 106 whether he or she has a frequent flyer number. If the end user 106 does not have a frequent flyer number, the IMR server 122 may provide the option to navigate to the "Loyalty Program" menu option 204c. The IMR server 122 may have built-in intelligence to identify temporary transactional information against user profile information and reuse them wherever its relevant. For example, context information entered upon selection of one menu option may be used in subsequent menu options. For example, in an exemplary IMR menu where an end user 106 may navigate from the "Check-In" menu option 204g to the "Flight Status" menu options 204d, the IMR server 122 may receive a flight number as context information in response to providing the "Check-In" menu option 204g and may use that flight number in the "Flight Status" menu option 204d. In some embodiments, the IMR server 122 may receive or retrieve context information automatically, without specific end user input. For example, the IMR server 122 may receive a telephone number (e.g. an ANI number) or an IP address associated with an interaction, and may automatically retrieve flight numbers stored in association with that AIN or IP address as context information for the interaction.

In the various embodiments of the present invention, the IMR server 122 is configured to prompt and receive user generated shortcuts (also referred to as pins or bookmarks) to a specific location of the IMR menu while navigating the menu. Once the specific location/option has been pinned, the user may fast forward to that location in the IMR menu next time the user places a call that is routed to the IMR server. Thus, the user need not traverse each menu option that appears in the navigation path to the pinned location and re-enter responses that would be provided during such navigating, but such responses are nonetheless maintained and retrieved during the fast forwarding.

In this regard, the IMR server 122 prompts the end user 106 to provide a particular command/input in order to pin the current menu option (e.g., "Press 1 to pin your current position in the menu" or "Say 'pin' to pin your current position in the menu."). According to one embodiment, the IMR server 122 allows pinning at only certain locations of the menu tree, such as when the user has reached an option that triggers a playback audio. Thus, the IMR server 122 refrains from inquiring whether the user wants to pin a menu option until the user has navigated to those points. In one embodiment, the pinnable menu options are options that are positioned at a leaf position of the menu tree. In some embodiments, the option to pin is not restricted to certain locations of the menu tree, but may be offered at any point during navigation. For example, the IMR server 122 may prompt the user to "select * or say 'pin' at any point of the navigation to jump to this location next time."

Accordingly, in act 308, the IMR server 122 determines whether the end user 106 has provided input indicating that he or she would like to pin the current menu option to which the use has navigated. If not, and if the end user 106 is not finished navigating the IMR menu 200 as determined in act 314, the IMR server 122 returns to providing the IMR menu 200.

If the end user 106 indicated that he or she does want to pin the current menu option, the IMR server 122 proceeds to act 310.

In act 310, the IMR server 122 prompts the end user 106 for an identifier, also referred to as a pin ID, for the pinned menu option. For example, in an embodiment where the IMR menu 200 is provided over a telephony call, the IMR server 122 may deliver a message stating "What would you like to name the pin?" and wait to receive a response from the end user 106. The end user may then utter a word or phrase, and the IMR server 122 captures the utterance, translates the utterance into text, and stores the text as the pin ID. In some embodiments, the IMR server 122 or another resource of a contact center may, alone or in combination, verify whether the pin ID is unique as compared to the other pin IDs belonging to the end user 106. If the pin ID is not unique, the IMR server 122 may deliver a message to the end user 106 warning him or her that the pin ID already exists, and prompt the end user 106 to enter another pin ID. In a contact center system which includes multiple IMR menus, the pin ID may be required to be unique for the given IMR menu, or may be required to be unique for all IMR menus included in the contact center system. In some embodiments, the IMR server 122 (or other contact center resource) may reject a new pin ID that is unique, but sounds similar to an existing pin ID, thereby preventing users from creating pin IDs that may be difficult for the end user 106 to select reliably.

In act 312, the IMR server 122 stores the pin ID in association with the end user 106 and the unique identifier 201 of the pinned menu option. Other information, such as context information, may also be stored in association with the pin ID. The context information may include, without limitation, a navigation path, information collected by the IMR system at certain points of the navigation, and the like.

If the end user 106 is not finished navigating the IMR menu 200 as determined in act 314, the IMR server 122 may return to act 304 to continue providing the IMR menu 200. In some embodiments, the end user is finished navigating the IMR menu 200 when the user terminates the call, or the IMR server 122 determines that the interaction should be routed to another contact center resource, such as a contact center agent.

According to one embodiment, the pin generated by a customer during a particular transaction is not tied to the particular transaction, but can be used for other transactions where the same IMR menu is invoked. In this regard, the pin or bookmark that is created by the customer need not disappear once the transaction that caused the generating of the pin is complete/resolved. According to one embodiment, the generated pin survives the present transaction. The pin may then be applied to a different, completely unrelated transaction of the customer that requires navigation of the IMR menu.

Figure 4:
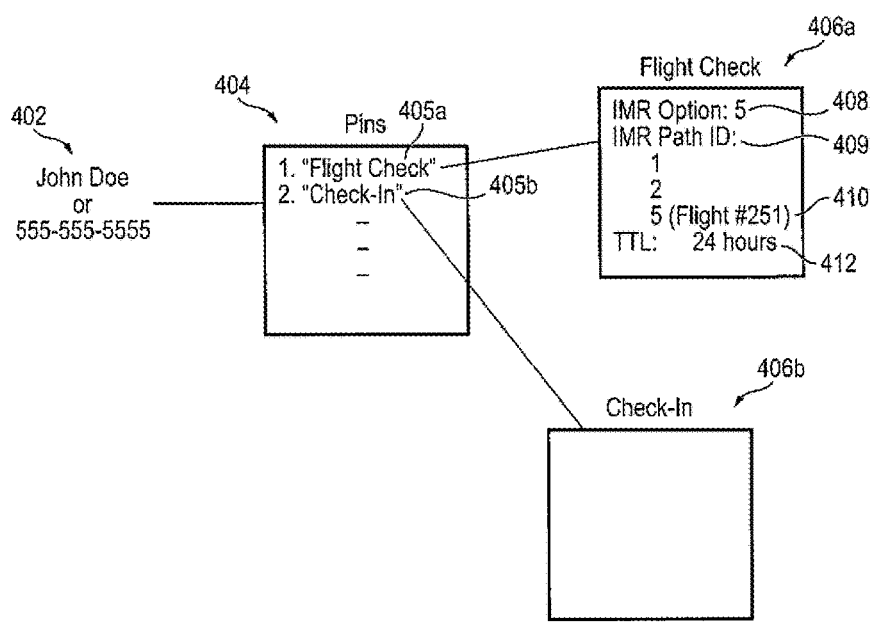
FIG. 4 is a layout diagram of records storing information on pinned IMR menu options according to an exemplary embodiment of the disclosure.

FIG. 4 is a layout diagram of records storing information on pinned IMR menu options according to an exemplary embodiment of the disclosure. The records may be stored in the CRM database of the mass storage device 126 hosted by the contact center system. In addition or in lieu of the storing at the contact center system, the records may also be stored in a data storage device coupled to the customer end user device 108. The storing and usage of records in a data storage device coupled to the customer end user device 108 may be accomplished as disclosed in U.S. Pat. No. 8,681,970, the disclosure of which is incorporated herein by reference in its entirety.

In the embodiment where the records are stored at the contact center system, the CRM database stores a user record 402 for a particular customer including data for identifying and/or authenticating the customer, such as a name, a username, an ANI, an IP address, and/or the like. The user record is associated with a pin list record 404 which contains, according to one embodiment, a list of pin IDs 405a, 405b (collectively referenced as 405) of menu options pinned by the particular customer. In this regard, the list of pins may be deemed to be a personalized IMR menu for the particular customer as it contains a list of menu options that the particular customer is most interested in.

Each pin ID 405a, 405b is associated with an individual pin record 406a, 406b (collectively referenced as 406). According to one embodiment, each pin record 406 includes information about the pinned menu item to which the record relates. In this regard, each pin record stores a unique identifier 408 of an IMR menu option it is associated with. In some embodiments, the pin record 406 may include an IMR path 409 that the end user 106 followed in navigating through the IMR menu 200 prior to pinning the corresponding menu option. Taking the example menu 200 of FIG. 2, and assuming that the pinned menu option is "flight status" 204d, the IMR path stored for this option is "1, 2, 5," indicating that the end user navigated from menu option 1, to menu option 2, and then menu option 5.

Each pin record 406 may also include any context information gathered, for example, by the IMR server 122 while interacting with the customer navigating the IMR menu 200. Such context information may include responses provided by the customer to prompts provided at specific points of the navigation. For example, a specific flight number provided by the customer at the menu option for "Flight Status" may be stored as context information 410 for this particular option. Of course, not all pinned menu options may need separately stored context information. For example, a pinned menu option to receive today's business hours may not require that the user have provided any express context in reaching this menu option. Instead, the IMR server 122, in providing the correct playback for the business, automatically determines a present date to provide the correct business hours.

In some embodiments, the pin record 406 may further store a time-to-live (TTL) value 412. An exemplary TTL value for checking flight status may be, for example, 24 hours. In this regard, a pin may only be valid up until expiration of its TTL value. In some embodiments, a TTL can be input by the end user 106 when creating the pin. In some embodiments, the duration of the TTL can be set automatically, either with a flat duration for all pins, with a duration dependent on which menu option is being pinned (for example, a shorter duration for pins to the "Flight Status" menu option 204d, and a longer duration for pins to the "Book" menu option 204f), or with a duration based on context information (for example, the duration for a pin to the "Flight Status" menu option 204d is set to expire a set duration after the arrival time of the flight corresponding to flight number context information). In some embodiments, the pin record 406 may additionally or alternatively have a limited number of uses for which it is valid.

In some embodiments, a company providing an IMR menu may restructure its IMR menu based on evolving needs of the company. The restructuring may cause a particular menu item to be removed, renamed, or moved to a different location of the IMR menu hierarchy. In the event of such restructuring, the IMR server 122 (or other server of the contact center) may be configured to map menu options in the prior IMR menu to menu options in the restructured IMR menu. The mapping may be, for example, mapping of the names, menu option IDs, IMR menu positions, and the like. According to one embodiment, if an IMR option in the prior IMR menu has been pinned, the pin record for the particular IMR option is also mapped to the menu option in the restructured IMR. In this regard, the IMR server 122 (or other server of the contact center) may be configured to search the CRM database for pin records generated for the prior menu option, and in the event of finding such pin records, modify the pin records to reflect information for the mapped menu option in the restructured IMR menu.

In some embodiments, a company providing an IMR menu many monitor the number of pin records 406 created for each menu option in its IMR menu. The company may restructure their IMR menu based on the number of pin records 406 created for different menu options. For example, in the IMR menu 200 shown in FIG. 2, if the "Flight Status" menu option 204d was pinned frequently (e.g. above a certain threshold number), the company may restructure the IMR menu 200 to move the "Flight Status" option to a higher level in the IMR tree to allow this option to be accessed more quickly than before. In this regard, the contact center system may display a recommendation to a contact center administrator to restructure the IMR menu, and may further indicate the kind of restructuring that is recommended (e.g., move "Flight Status" option to level 1 of the IMR tree).

Figure 5:
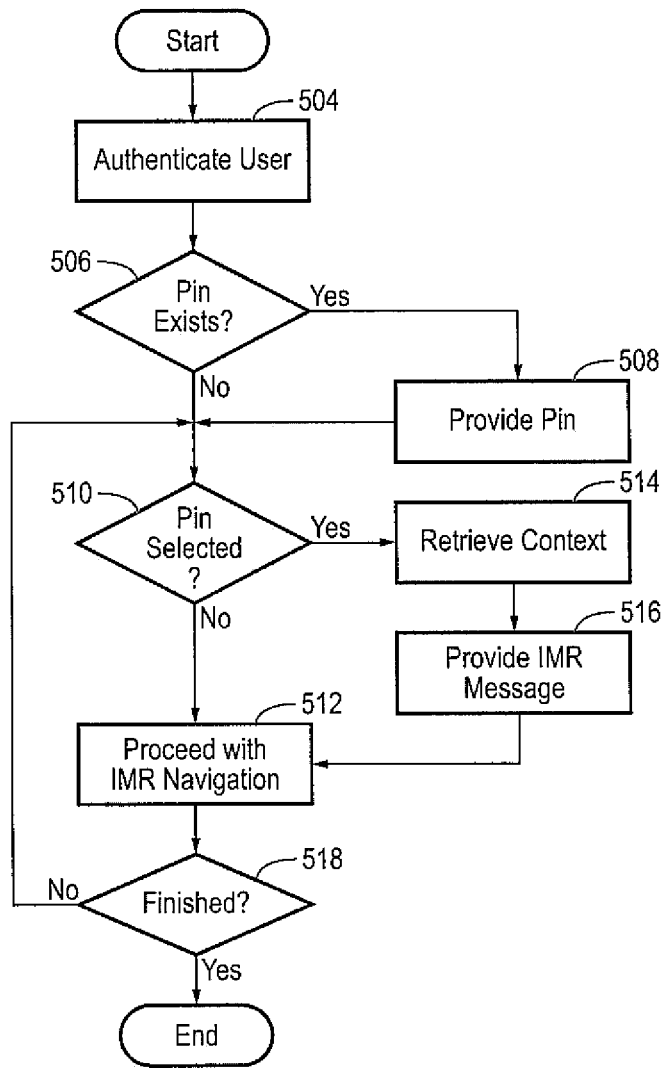
FIG. 5 is a flow diagram of a process for providing an IMR menu to an end user and allowing the end user to access a pinned menu option in the IMR menu according to an exemplary embodiment of the disclosure.

FIG. 5 is a flow diagram of a process for providing an IMR menu to an end user 106 and allowing the end user 106 to access a pinned menu option in the IMR menu according to an exemplary embodiment of the disclosure.

In act 504, the IMR server 122 (or alternatively, another component of the contact center system) identifies and/or authenticates an end user 106 as needed. Information transmitted along with an inbound call may be sufficient to identify and/or authenticate the user. For example, the ANI of the user may be sufficient to identify the user. For further authentication of the user, the IMR server 122 may prompt the end user 106 for user information if the authentication information is not already automatically transmitted by the end user device 108 along with an interaction request. For example, the user may need to provide express authentication information in embodiments where the user records, including the pin records 406, are stored at the contact center in order to retrieve such records. The IMR server 122 may retrieve the user record 402 from a data storage device (e.g. from the CRM database of the mass storage device 126 hosted by the contact center system) based on the initial user information, and may compare the received information with information contained in the user record 402. For example, the end user 106 may be authenticated by prompting and receiving an account number that the customer is trying to access, social security number, password, date of birth, home telephone number, and the like.

According to one embodiment, the customer records are stored at the end user device 108 instead of (or in addition to) the contact center. In this embodiment, the user records, including the user record 404 and pin records 406, are automatically provided to the IMR server 122 along with the interaction request. Allowing the user records to be maintained at the end user device 108 may help avoid the user from entering authentication information, further expediting the interaction between the customer and the IMR server 122.

In act 506, the IMR server 122 accesses the pin list record 402 (whether provided by the end user device 108 or obtained from the contact center database), and determines whether there are any valid pins in the pin list record 404. In this regard, the IMR server 122 retrieves the pin records 406 and determines if they are valid, for example, if the pin records have expired (e.g., their TTL values have expired). In some embodiments, if pin records 406 are found to be invalid, the IMR server 122 may provide a message to the end user 106 indicating that invalid pins were found. In some embodiments, the message may include the reason or reasons why the pin record 106 is invalid. If there is one or more valid pin records 406, the IMR server 122 provides the end user 106 with the valid pin records in act 508, and provides the end user with an opportunity to select one of the valid pin records. For example, in the exemplary records of FIG. 4, the IMR server 122 may determine that pin records for "Flight Check" 406a and "Check-In" 406b are valid, and output the pin identifiers 405a, 405b identifying the pinned menu items. The IMR server 122 may, for example, provide a message such as an audio message to the end user 106 stating "You have two pinned menu locations; say 'Flight Check' to go to your Flight Check location . . . say 'Check-In' to navigate to your check in location." In some embodiments, the IMR server 122 may additionally provide the end user 106 with pertinent context information associated with a pin record. For example, for the exemplary pin record 406a, the IMR server 122 may provide a message stating "say 'Flight Check' to hear the flight status for flight #251." The IMR server 122 may then wait for the end user 106 to input which, if any, of the presented pin records 406 he or she wishes to navigate to.

In some embodiments, in addition or alternative to prompting the end user 106 to select a pin, the IMR server 122 may allow the user to select a pin at any time. The IMR server 122 may load valid pins in the background and may monitor the interaction for pin IDs entered at any point, without prompting for the user to enter a pin ID.

In act 510, the IMR server 122 determines if a pin was selected by the end user 106. For example, upon providing the end user 106 with an opportunity to select one of the valid pin records 406 in act 508, the IMR server may wait for input from the end user 106 which either selects one of the presented pins or indicates that the end user 106 would like to take an action other than navigating to one of the presented pins. In another example, the IMR server 122 may detect that the end user 106 has given an input such as an utterance which corresponds to a valid pin ID. If no pin was selected, the IMR server 122 proceeds with navigation of the IMR menu 200 at act 512.

If the IMR server 122 determines that the end user 106 selected a pin, then the IMR server 122 may retrieve the pin record 406 and context information associated with the selected pin at act 514. For example, in the exemplary records of FIG. 4, if the IMR server 122 determines that the end user 106 has selected pin ID 405a, the IMR server may retrieve the Flight Check pin record 406a and the "Flight #251" context information 410. The retrieved context information is available to the IMR server 122 for use in the interaction going forward. In some embodiments, the full previous navigation path is restored; for example, in some embodiments the IMR server 122 may generate an IMR menu structure dynamically based on factors such as user input or context information. In such embodiments, upon determining that the end user 106 selected a pin, the IMR server 122 may place the current interaction into substantially the same state as was present in the interaction in which the pin was created.

In act 516, the IMR server 122 provides the menu option with the unique identifier 408 contained in the selected pin record 406. Where applicable, the IMR server 122 does so using retrieved context information. For example, in the exemplary records of FIG. 4 and exemplary menu of FIG. 2, the end user 106 has selected pin record 406a. Pin record 406a includes unique identifier "5" 408 and "Flight #251" context information 410. Accordingly, the IMR server 122 provides the end user 106 with the "Flight Status" menu option 204d, which may deliver flight status information for flight 251 to the end user 106. The end user 106 does not need to navigate through the "Travel Info" menu option 204a to retrieve this flight status information.

At act 512, IMR server 122 proceeds with navigation of the IMR menu 200 from the provided menu option.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In some embodiments, the IMR server 122 may provide pinning capability across multiple IMR channels. A user may pin a menu option 204 using a first medium, and return to the pin using a second medium. In that regard, an end user 106 may navigate through a first IMR channel menu to a menu option 204. The end user 106 may create a pin record 406 to the menu option 204 which is stored in association with a user record 402 for the end user 106. The end user 106 may then access a second IMR channel menu using the same user record 402. The second IMR channel menu may have a similar menu structure to the first IMR channel menu, or may otherwise have one or more menu options mapped to the first IMR channel menu. The IMR server 122 may load the pin record 406 in association with the second IMR channel.

In some embodiments, the pin record 406 may not be valid for a particular IMR channel unless that particular IMR channel's IMR menu has a menu option 204 with a unique identifier 201 corresponding to the unique identifier stored in the pin record 206. In such a circumstance, the unique identifier 206 may be "unique" in a given IMR channel, but may be repeated across several related IMR channels.

Upon detecting that the end user 106 has selected the pin record 406 created in the first IMR channel, the IMR server 122 may provide a menu option in the second IMR channel with the same unique identifier 408, or may provide a menu option in the second IMR channel which is mapped to the pinned menu option of the first IMR channel. The IMR server 122 may also provide the context information associated with the pin record 406 for use in the second IMR channel.

For example, an end user 106 may access a chat-based IMR (e.g. an automated chat response system), by logging into an account which is linked to his telephone's ANI. The end user 106 may navigate through a chat-based IMR menu (i.e. a first IMR channel) to a "Flight Status" menu option 204d and enter "Flight #251" as context information. The end user 106 may create a pin record 406 to the "Flight Status" menu option 204d which has a unique identifier "5" and is stored in association with a user record 402 for the end user 106.

The end user 106 may then access an IVR menu (i.e. a second IMR channel) using his telephone. Because the account is linked to the phone number, the IMR server 122 may recognize the ANI of the telephone, and accordingly use the user record 102 for the interaction. The IMR server 122 may check for pin records 406, load pin records 406, and determine whether the end user 106 selected a pin record 406 (for example, as described above regarding act 506 and act 508). The end user 106 may select the pin record associated with the "Flight Status" menu option 204d generated in the chat-based IMR menu. The IMR server 122 may provide the end user 106 with a corresponding "Flight Status" menu option in the IVR menu. The IMR server 122 may also retrieve the "Flight #251" context information, and accordingly the IVR "Flight Status" menu option may provide a message communicating the status of Flight #251 through the IVR. The "Flight Status" menu option in the IVR menu may also have a unique identifier "5."

In one embodiment, each of the various servers, controllers, engines, and/or modules (collectively referred to as servers) in the afore-described figures may be a process or thread, running on one or more processors, in one or more computing devices 1500 (e.g., FIG. 6, FIG. 7), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6:
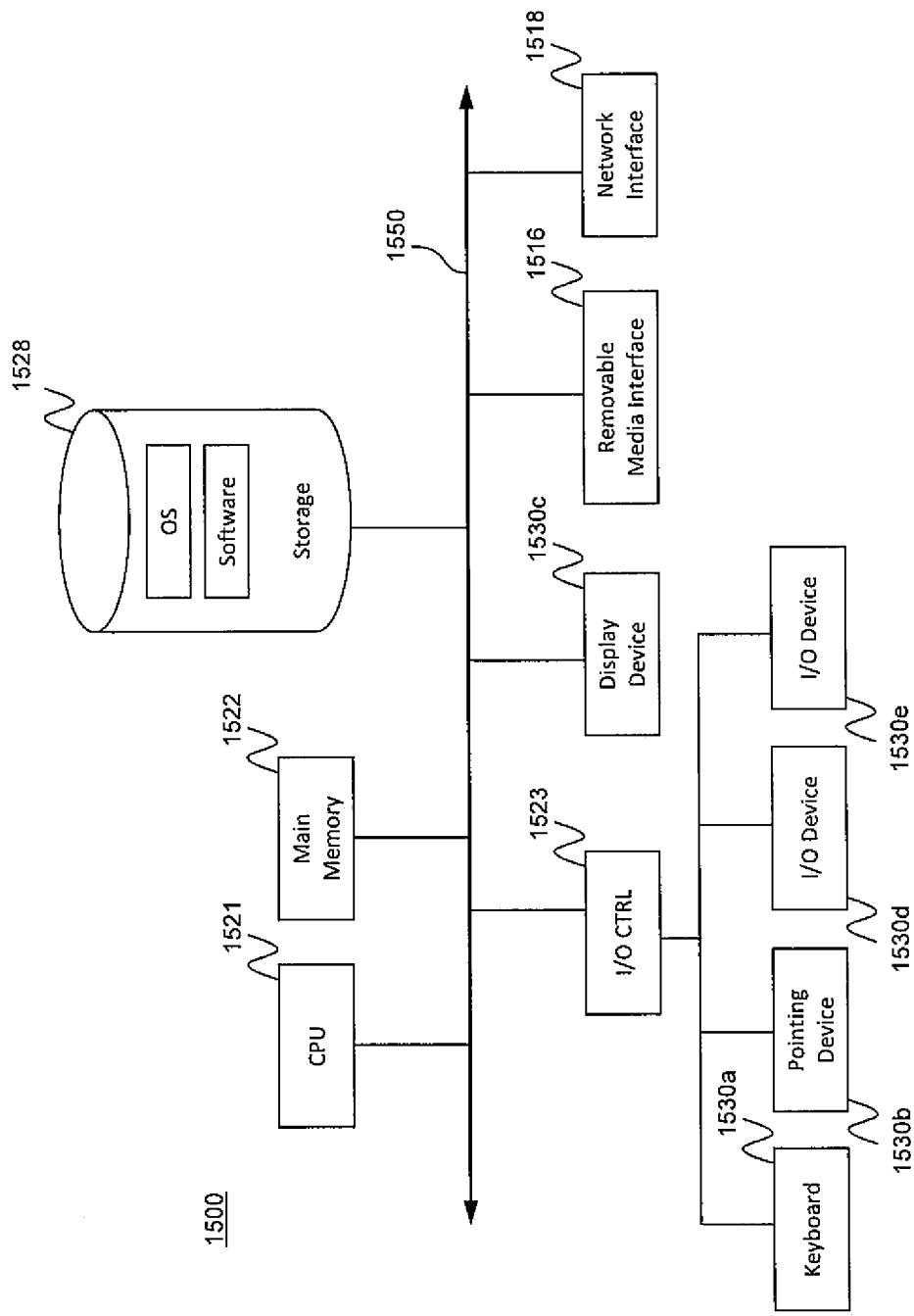
FIG. 6 is a block diagram of a computing device according to an embodiment of the present invention.
Figure 7:
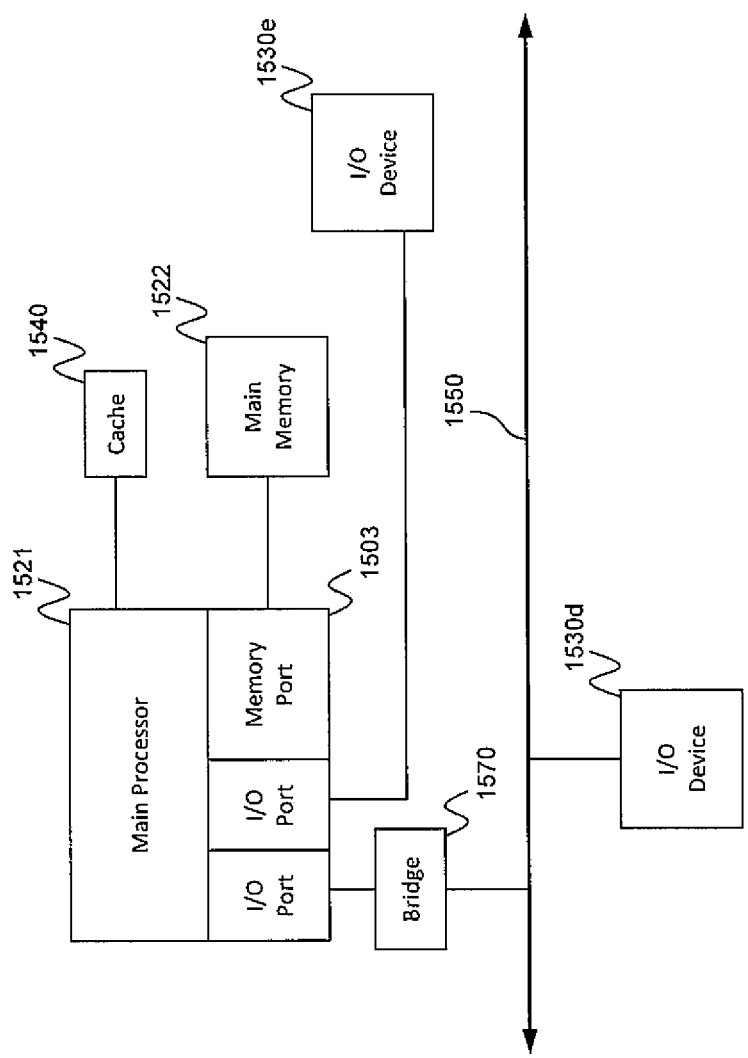
FIG. 7 is a block diagram of a computing device according to an embodiment of the present invention.

FIG. 6 and FIG. 7 depict block diagrams of a computing device 1500 as may be employed in exemplary embodiments of the present invention. Each computing device 1500 includes a central processing unit 1521 and a main memory unit 1522. As shown in FIG. 6, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6, the central processing unit 1521 communicates with the main memory 1522 via a system bus 1550. As shown in FIG. 7, the central processing unit 1521 may also communicate directly with the main memory 1522 via a memory port 1503.

FIG. 7 depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7 depicts an embodiment of a computer 1500 in which the central processing unit 1521 communicates directly with I/O device 1530e. FIG. 7 also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530*c*, speakers, and printers. An I/O controller 1523, as shown in FIG. 6, may control the I/O devices. The I/O controller may control one or more I/O devices such as a keyboard 1530*a* and a pointing device 1530*b*, e.g., a mouse or optical pen.

Referring again to FIG. 6, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 6 and FIG. 7 may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 9:
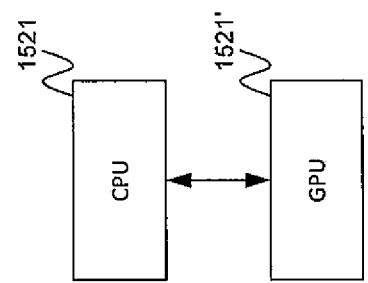
FIG. 9 is a block diagram of a computing device according to an embodiment of the present invention.
Figure 8:
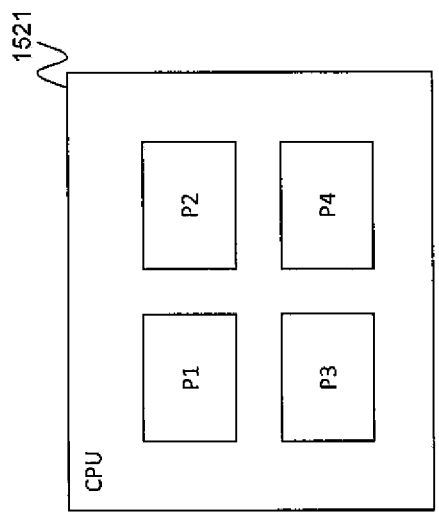
FIG. 8 is a block diagram of a computing device according to an embodiment of the present invention.

As shown in FIG. 8, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 10:
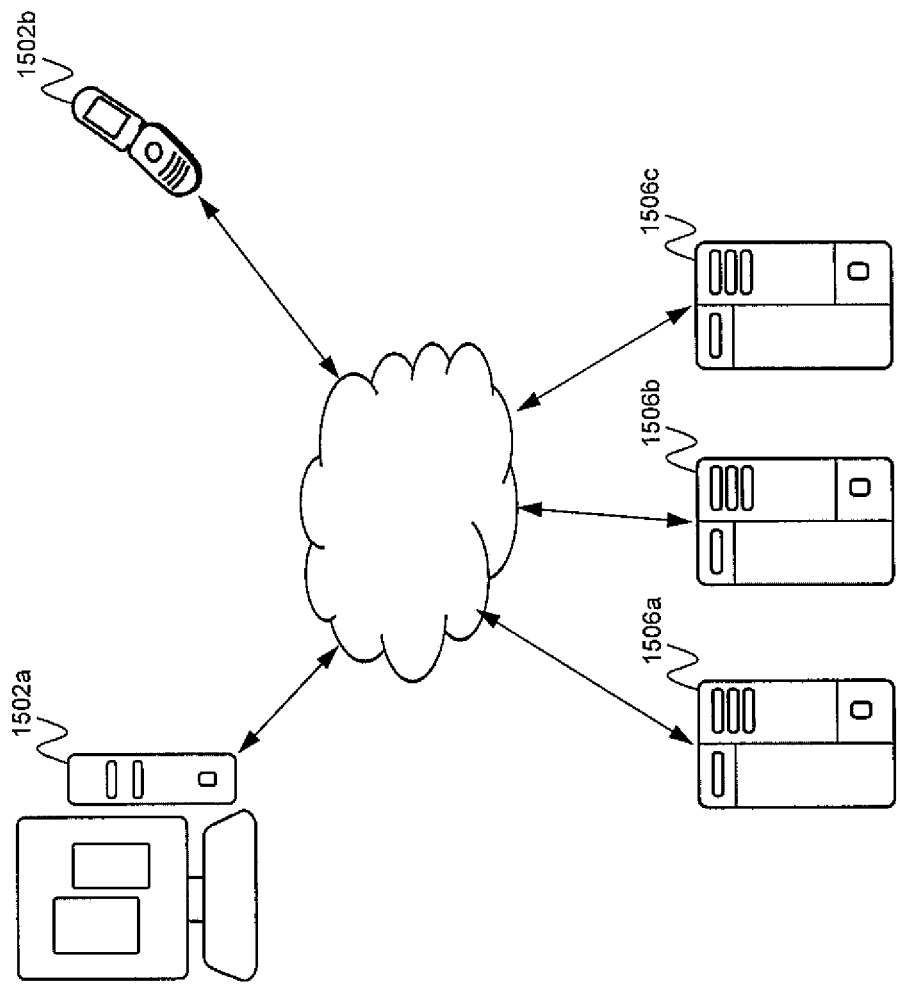
FIG. 10 is a block diagram of a network environment including several computing devices according to an embodiment of the present invention.

A computing device may be one of a plurality of machines connected by a network, or it may comprise a plurality of machines so connected. FIG. 10 shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 10, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 10 may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

What is claimed is:

1. A method for generating a pin in an interactive voice response (IVR) system, the method comprising:
   providing, by a processor, an IVR menu having a plurality of menu options;
   monitoring, by the processor, navigation of the IVR menu;
   storing, by the processor, a navigation path corresponding to the plurality of menu options traversed during the navigation of the IVR menu;
   storing, by the processor, an input received from an end user during the navigation of the IVR menu, wherein the input is received in association with a particular menu option of the plurality of menu options traversed during the navigation of the IVR menu, and stored in association with the particular menu option;
   receiving, by the processor, a command for creating a pin to a current menu option of the plurality of menu options;
   generating, by the processor, an identifier in response to the command; and
   storing, by the processor, the identifier in association with the end user, the current menu option, the navigation path, and the input received from the end user.

2. The method of claim 1, wherein the identifier is a spoken word or phrase, wherein the method further comprises converting the word or phrase to text prior to storing the identifier in association with the end user, the current menu option, the navigation path, and the input received from the end user.

3. The method of claim 1, wherein monitoring navigation of the IVR menu comprises receiving the menu options navigated by the end user and generating a menu path, and wherein the identifier is stored, by the processor, in association with the menu path.

4. The method of claim 1, further comprising generating a time to live (TTL) value for the pin, wherein the identifier is stored, by the processor, in association with the TTL value.

5. The method of claim 1, further comprising receiving, by the processor, a user generated time to live (TTL) value for the pin, wherein the identifier is stored, by the processor, in association with the user generated TTL value.

6. The method of claim 1, wherein providing the IVR menu comprises providing one or more pinnable menu options of the plurality of menu options which provide the end user with the ability to input a command for creating a pin, and wherein the current menu option is a pinnable menu option.

7. A method for providing an interactive voice response (IVR) menu in an IVR system, the method comprising:
   identifying, by a processor, an inbound interaction from an end user;
   providing, by the processor, an IVR menu having a plurality of menu options, in response to the identified inbound interaction, wherein a first menu option of the plurality of menu options is associated with an identifier generated in response to a command to pin the first menu option;
   identifying, by the processor, the identifier stored in association with the first menu option;
   providing, by the processor, the identifier to an end user;
   receiving, by the processor, a command in response to providing the identifier;
   retrieving, by the processor, in response to the command, data stored in association with the identifier, the data including the first menu option, a navigation path corresponding to a prior navigation of the IVR menu, and an input received from the end user during the prior navigation of the IVR menu;
   placing, by the processor, the interaction in a particular state based on the retrieved navigation path and the retrieved input; and
   providing, by the processor, the first menu option.

8. The method of claim 7, wherein the identifier is stored in association with context information.

9. The method of claim 8, wherein providing the first menu option comprises generating a content of the first menu option based on the context information.

10. The method of claim 7, wherein identifying the identifier stored in association with the first menu option comprises identifying a plurality of identifiers stored in association with a user record, each of the plurality of identifiers being stored in association with respective menu options, providing the identifier to the end user is providing each of the plurality of identifiers, and the command in response to providing the identifier is selecting the identifier from the plurality of identifiers.

11. The method of claim 7, further comprising authenticating, by the processor, that the end user is associated with the identifier.

12. The method of claim 11, wherein the identifier is stored in association with a recorded automatic number identification (ANI) number or recorded internet protocol (IP) address, and wherein authenticating that the end user is associated with the identifier comprises comparing an ANI number or an IP address of the end user for the inbound interaction with the recorded ANI number or recorded IP address.

13. The method of claim 7 wherein the identifier is stored in association with a time to live (TTL) value, and further comprising determining, by the processor, that the identifier is valid based on the TTL value.

14. The method of claim 7, further comprising identifying, by the processor, a user record associated with the end user, and determining, by the processor, that the user record is stored in association with one or identifier.

15. A system for providing an interactive voice response (IVR) menu, the system comprising:
- a processor;
- memory coupled to the processor and storing computer instructions therein, wherein the instructions cause the processor to:
  - provide an IVR menu having a plurality of menu options;
  - monitor navigation of the IVR menu;
  - store a navigation path corresponding to the plurality of menu options traversed during the navigation of the IVR menu;
  - store an input received from an end user during the navigation of the IVR menu, wherein the input is received in association with a particular menu option of the plurality of menu options traversed during the navigation of the IVR menu, and stored in association with the particular menu option;
  - receive a command for creating a pin to a current menu option of the plurality of menu options;
  - generate an identifier in response to the command; and
  - store the identifier in association with the end user, the current menu option, the navigation path, and the input received from the end user.

16. The system of claim 15, wherein the identifier is a spoken word or phrase, wherein the processor further converts the word or phrase to text prior to storing the identifier in association with the end user, the current menu option, the navigation path, and the input received from the end user.

17. The system of claim 15, wherein monitoring navigation of the IVR menu comprises receiving the menu options navigated by the end user and generating a menu path, and wherein the processor stores the identifier in association with the menu path.

18. The system of claim 15, wherein providing the IVR menu comprises providing one or more pinnable menu options which provide the end user with the ability to input a command for creating a pin, and wherein the current menu option is a pinnable menu option.

* * * * *